United States Patent Office 2,770,652
Patented Nov. 13, 1956

2,770,652

POLYFLUORO-ETHERS OF OXIMES AND PREPARATION THEREOF

David Charles England, Wilmington, Del., assignor to E. I. du Pont de Nemours and Company, Wilmington, Del., a corporation of Delaware No Drawing. Application June 1, 1955,
Serial No. 512,565

15 Claims. (Cl. 260—566)

This invention relates to a new process for preparing functionally substituted polyfluoro-organic compounds and to the new polyfluoro-substituted compounds thereby obtained.

Heretofore the availability of highly fluorinated organic compounds, especially those carrying functional substituents in addition to the fluorine atoms, has been severely limited because of synthesis difficulties inherent in their unusual molecular structure which is responsible for the high physical and chemical stability of compounds of this broad class. However, by means of recently developed techniques, low molecular weight fluoroolefins can be used to prepare higher molecular weight fluoroolefins carrying on at least one of the olefinic carbons at least one fluorine atom, said olefinic carbon having bonded to it through aliphatically saturated carbon a higher hydrocarbon radical or a plurality of organic functional groups (see the copending application of Dixon, S. N. 374,450, filed August 14, 1953).

This new process involves the addition of organoalkali metal compounds across the olefinic linkage in the low molecular weight polyfluoro-substituted olefin with spontaneous splitting off, i. e., liberation, of alkali metal fluoride, thereby leaving the desired mono-substituted fluoroolefin.

It is an object of this invention to provide a process whereby an addition across the ethylenic unsaturation in the same classes of highly fluorinated olefins of lower molecular weight may be accomplished without liberation of alkali metal fluoride. Another object of this invention is to provide a process for readily preparing highly fluorinated organic compounds carrying functional substituents in addition to the fluorine atoms. A further object of this invention is to prepare new and useful polyfluoroethyl and substituted polyfluoroethyl oxime ethers.

These objects are accomplished by reacting an O-alkali metal salt of an oxime with a low molecular weight polyfluoroolefin. It has surprisingly been discovered that the O-alkali metal salts of oximes, including both aldoximes and ketoximes, add across the ethylenic unsaturation in the aforementioned low molecular weight substituted fluoroolefins without liberation of alkali metal fluoride. The stable adducts of this reaction are readily hydrolyzed to polyfluoroethyl and substituted polyfluoroethyl oxime ethers. This reaction further differs from earlier ones in that only one molar proportion of the organo-alkali metal oxime salt can enter into the reaction.

The O-alkali metal oxime, i. e., aldoxime and ketoxime, reactant salts, which are preferably used in substantially equimolar proportions based on the polyfluoroolefin, are represented by the formula

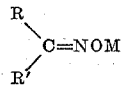

wherein R and R', which can be alike or different and can be together joined to form a 5–7 membered cyclic structure, represent hydrogen or any organic radical linked to the indicated carbon atom through an aliphatically saturated carbon atom and M represents an alkali metal, i. e., the metals of group I-A of the periodic table, especially lithium, sodium, and potassium, which salts are preferred. The preferred oxime, both aldoxime and ketoxime, salts are those of the above structure in which the radicals R and R', which can be alike or different and can be joined together to form a 5–7 membered carbocycled, are hydrogen or aliphatically saturated hydrocarbon radicals containing from 2 to 18 carbons apiece, including alkyl, aryl, cycloalkyl, alkaryl, and aralkyl hydrocarbon radicals. The most preferred oxime salts are those as described immediately above wherein neither R nor R' is hydrogen, i. e., the ketoxime salts.

The low molecular weight polyfluoroolefin which is to be reacted with the above O-alkali metal oxime salts must have the general formula

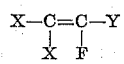

wherein each X represents a halogen, alike or different, and especially chlorine or fluorine, and Y is fluorine or a perfluoroalkyl radical. Thus, the fluoroolefin reactant, including the cyclic fluoroolefins, must be those in which one olefinic carbon carries two atoms of fluorine or one fluorine atom and a perfluoroalkyl radical, and the other olefinic carbon carries two halogens, preferably fluorine or chlorine. Y and one X together may be a divalent perfluorocarbon chain of at least 2 carbon atoms, such as $-CF_2-CF_2-$, which forms a cyclic ring with the doubly bonded carbon atoms, i. e., a cyclic fluoroolefin nucleus. Because of readier availability and increased reaction efficiency, the preferred fluoroolefins are fluoromonoolefins having a chain of no more than 8 carbons, including the two carbons of the olefinic group; carrying a total of at least two fluorine atoms on the said olefinic carbons; and having the remaining valences (2) of the said single olefinic group satisfied by linkage to halogen, especially to fluorine, and perfluoroalkyl radicals. This latter class of polyfluoromonoolefins (i. e., the monoolefins of no more than 8 carbons, including the olefinic carbons, having at least two fluorine atoms directly linked to said olefinic carbons, and having the remaining valences of said olefinic carbons satisfied by linkage to fluorine or perfluoroalkyl radicals) is particularly preferred because of greater ease of reaction.

The new addition and hydrolysis products obtained as above, i. e., the O-polyfluoroethyl and substituted ethyl oxime ether alkali metal salts and the free ethers can be represented, respectively, by the formulas

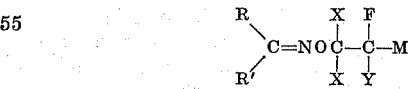

and

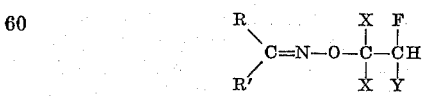

wherein R, R', X, Y, and M are as above.

The following examples in which the parts are by weight are submitted to illustrate the invention more clearly but not to limit it.

Example I

To a solution of 11.3 parts of cyclohexanone oxime in the presence of about 50 parts of anhydrous dioxane in a pressure reactor was added 1.2 parts (0.5 molar proportion based on the oxime) of metallic sodium and the resultant mixture stirred under reflux for one hour. Tetrafluoroethylene was pressured into the resultant suspension of the white sodium salt of cyclohexanone oxime at 80° C. with stirring at about 40 lbs./sq. in. until no further tetrafluoroethylene was absorbed. About five parts (an equimolar proportion based on the sodium) of tetrafluoroethylene was absorbed, mostly in the first ten minutes of the reaction. The resultant dark suspension of the sodium salt of the O-(1,1,2,2-tetrafluoroethyl) ether of cyclohexanone oxime was poured into dilute aqueous sulfuric acid with stirring and the mixture then extracted with diethyl ether. The ether extract was dried over anhydrous calcium sulfate, the ether removed by distillation at atmospheric pressure, and the product finally purified by precision distillation. There was thus obtained 9.4 parts (44% of theory) of the O-(1,1,2,2-tetrafluoroethyl) ether of cyclohexanone oxime as a clear, colorless liquid, boiling at 77° C. under a pressure corresponding to 10 mm. of mercury, $n_D^{25}$ 1.4060.

*Analysis.*—Calc'd for $C_8H_{11}ONF_4$: C, 45.1%; H, 5.2%; N, 6.6%; F, 35.6%. Found: C, 44.9%; H, 5.6%; N, 6.6%; F, 35.2%. The product was stable to 30% aqueous potassium hydroxide solution at the reflux. It is to be noted that under identical conditions using only catalytic amounts of sodium none of the tetrafluoroethyl ether was obtained.

Example II

To a solution of 29.2 parts of acetone oxime in the presence of about 100 parts of dioxane was added 15.6 parts (an equimolar proportion based on the oxime) of sodium amide and the mixture stirred in a pressure reactor at room temperature until ammonia was no longer evolved. Tetrafluoroethylene was then pressured into the resulting suspension of the sodium salt of acetone oxime at 125° C. with stirring at about 40 lbs./sq. in. until tetrafluoroethylene was no longer absorbed. The reaction required approximately 15 minutes. The resultant dark suspension of the sodium salt of the O-(1,1,2,2-tetrafluoroethyl) ether of acetone oxime was poured with stirring into dilute aqueous sulfuric acid solution and the mixture then extracted with diethyl ether. The ether extract and one from an identical reaction were combined, dried over anhydrous calcium sulfate, and the diethyl ether removed by distillation at room temperature. Dioxane was removed from the combined extracts by washing with water. Upon precision distillation of the residue, there was obtained 10 parts (11.5% of theory) of the O-(1,1,2,2-tetrafluoroethyl) ether of acetone oxime as a clear, colorless liquid, boiling at 126–127° C. at atmospheric pressure, $n_D^{25}$ 1.3501.

*Analysis.*—Calc'd for $C_5H_7ONF_4$: C, 34.7%; H, 4.1%; F, 44.0%. Found: C, 35.9%; H, 4.3%; F, 43.3%.

Example III

To a solution of 27.0 parts of acetophenone oxime in 150 parts of anhydrous dioxane in a pressure reactor was added 4.0 parts (0.87 molar proportion based on the oxime) of finely divided, metallic sodium and the mixture was agitated for eight hours by which time substantially all the sodium had reacted. The reaction vessel was flushed with nitrogen gas and then with tetrafluoroethylene to remove air and then pressured to 40 lbs./sq. in. with tetrafluoroethylene and heated with shaking at 85° C. for six and a half hours with intermittent addition of tetrafluoroethylene as needed to maintain the pressure until approximately 18 parts (substantially equimolar proportion based on the sodium) of tetrafluoroethylene was absorbed. The resultant solution was heated on a steam bath at atmospheric pressure to remove substantially all of the dioxane. The liquid residue was then mixed thoroughly with 200 parts of aqueous 5% sulfuric acid and extracted repeatedly with cold diethyl ether. The ether extract was washed with 5% aqueous sodium chloride solution, dried over anhydrous magnesium sulfate and filtered. After distilling off the ether, the dark liquid residue (35 parts) was fractionally distilled through a precision column to give 23 parts (56% of theory) of the O-(1,1,2,2-tetrafluoroethyl) ether of acetophenone oxime as a clear colorless liquid boiling at 88–89° C. under a pressure corresponding to 6 mm. of mercury.

*Analysis.*—Calc'd for $C_{10}H_9ONF_4$: N, 6.0%; F. 32.3%. Found: N, 5.7%; F, 30.4%.

Example IV

A mixture of a solution of 16.9 parts of cyclohexanone oxime in 100 parts of anhydrous dioxane and 2 parts (0.6 molar proportion based on the oxime) of finely divided sodium metal was refluxed and agitated until all of the metal had dissolved. The mixture was then charged into a pressure vessel, the vessel sealed, 18 parts (1.8 molar proportion based on the sodium) of chlorotrifluoroethylene gas was introduced under pressure and the mixture then heated for eight hours at 80° C. (internal temperature) with shaking under autogenous pressure. The reactor was cooled and vented and the reaction mixture was diluted with diethyl ether and poured into 5% aqueous sulfuric acid solution at 10° C. After thorough mixing and double extraction with diethyl ether, the combined ether extracts were washed with 5% aqueous sodium chloride solution, dried over anhydrous magnesium sulfate, and the ether removed by distillation, leaving 28 parts of a dark liquid residue. On fractional distillation there was obtained 6.4 parts (30% of theory) of the chlorotrifluoroethyl) ether, of cyclohexanone oxime as a clear colorless liquid boiling at 72–73° C. under a pressure corresponding to 4 mm. of mercury, $n_D^{25}$ 1.4355.

*Analysis.*—Calc'd for $C_8H_{13}OClF_3$: Cl, 15.4%; F, 24.8%; N, 6.1%. Found: Cl, 14.8%; F, 25.4%; N, 6.1%.

As is apparent from the foregoing examples, these new ethers are readily prepared by a simple, straight-forward process. The alkali metal salt of the requisite oxime is prepared directly from the oxime itself and the alkali metal or a source thereof such as, for instance, the alkali metal amides, preferably in an inert organic solvent which is also used for the coupling reaction with the fluoroine-containing organic compound. The latter is passed into the solution of the alkali metal oxime usually in equivalent amount or in slight excess of that required for complete reaction. Higher proportions, e. g., 50–100% excess, can of course, be used but contribute little to the efficiency of the reaction. Most conveniently the low molecular weight polyfluoroolefin is pressured into the reaction zone under slight superatmospheric pressure, e. g., of the order of 25–50 lbs./sq. in. The temperature employed will depend upon the respective fluoroolefin being used and generally will be such as to retain a material amount thereof in solution in the reaction mixture and to avoid extreme pressures and the hazards involved therewith, particularly for the gaseous fluoroolefins. Conventionally the reaction will be carried out at temperatures ranging from room temperature to about 150° C.

The inert organic solvent employed can be any one of those which is inert to the alkali metals or their metal forming derivatives, the alkali metal oxime salts, the fluoroolefins and the resultant fluoroethyl oxime ethers. Generally, the solvent will be one of the conventional, normally liquid, inert organic solvents such as the open chain ethers, e. g., diethyl or dibutyl ether, 1,2-dimethoxyethane; the cyclic ethers, e. g., dioxane; the hydrocarbons, both aromatic and aliphatic, such as benzene, hexane; the halogenated hydrocarbons including both aliphatic and aromatic such as carbon tetrachloride, chlorobenzene; lower aliphatic acid amides, such as dimethylformamide, dimethylacetamide; and the like.

The reaction apparently takes place rather rapidly and is generally over within a few minutes to a few hours, e. g., from 10–30 minutes to 2–8 hours. Reaction times will vary with temperature, the nature of the reactants, and like variables. In any case, reaction times greater than 6–8 hours will not generally be needed. The product obtained directly is the alkali metal salt of the polyfluoroethyl or substituted ethyl ether of the oxime involved. The free ethers are obtained easily by simple acid hydrolysis of the reaction mixture and extraction of the resultant aqueous acid hydrolysis mixture with a suitable organic solvent. The desired free ether is obtained from the extract by conventional means involving usually simple precision distillation for the conventional liquid, lower molecular weight polyfluoroalkyl oxime ethers. As the molecular weight increases the products increase in boiling point and gradually reach the level where they are solids at room temperature. This is generally true of those polyfluoroethyl oxime ethers having more than about 8–10 carbons in any single substituent R of the foregoing structural formulas, i. e., attached to the doubly bonded oxime carbon and/or to the 2-carbon of the ethyl or substituted ethyl ether group. Such compounds can be purified by conventional precipitation, recrystallization, or solvent extraction techniques.

Suitable specific O-alkali metal aldoxime and ketoxime salts, in addition to those illustrated in detail in the foregoing examples, which can be reacted with the low molecular weight fluoroolefins to form the new polyfluoroethyl oxime ethers of the present invention include, as further illustrative of the formula

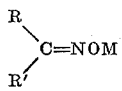

wherein R, R', and M are as before, are the lithium salt of dibenzylketoxime, the potassium salt of dibutylketoxime, the sodium salt of diphenylketoxime (i. e., benzophenone oxime), the potassium salt of cyclopentanone oxime, the sodium salt of acetaldoxime, the lithium salt of heptaldoxime, the lithium salt of benzaldoxime, the sodium salt of cyclohexanaldoxime, and the like.

Specific low molecular weight polyfluoromonoolefins for use as reactants with the O-alkali metal oxime salts in accordance with this invention and further illustrative of the structural formula

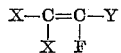

wherein X and Y are as before, and more specifically illustrative of the preferred polyfluoromonoolefins of no more than 8 carbons, including the said olefinic carbons, wherein there are at least two fluorine atoms bonded to said olefinic carbons with the remaining valences thereof being satisfied by direct linkage to halogen or perfluoroalkyl radicals, especially by linkage to halogen, particularly fluorine and chlorine, include, in addition to those illustrated in detail in the foregoing examples, 1,1-dichloro-2,2-difluoroethylene, perfluoropropene, perfluoroheptene-1, perfluorocyclobutene and the like.

The new polyfluoroethyl and substituted polyfluoroethyl oxime ethers of this invention resulting from the aforesaid specific O-alkali metal oxime salts and low molecular weight polyfluoromonoolefins taken in order pairwise, which are further illustrations of the general formula

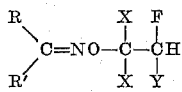

include, respectively, the O-(1,1-dichloro-2,2-difluoroethyl) ether of dibenzylketoxime, the O-(1,1,2,2-tetrafluoro-2-trifluoromethylethyl) ether, i. e., the O-(perfluoropropyl) ether, of dibutylketoxime, the O-(1,1,2,2-tetrafluoroethyl-2-perfluoropentyl) ether, i. e., the O-(perfluoroheptyl) ether of benzophenone oxime, the O-(2-hydroperfluorocyclobutyl) ether of benzaldoxime, and the like.

Because of their non-corrosive nature, generally stable character, relatively high density and normal boiling point, the lower molecular weight normally liquid, polyfluoroethyl and substituted ethyl oxime ethers of this invention are of generic utility as fluids for use in the transmission of power by hydraulic machinery, that is, the so-called hydraulic fluids. For instance, they are useful as the fluid in a conventional hydraulic brake mechanism, hydraulic presses, hydraulic folk-lift trucks, and the like. Their chemical inertness, e. g., good acid and base resistivity, make them outstanding for use in hydraulic systems operating under rigorous acid and/or basic conditions, such as are encountered in metal rolling, treating, descaling, and pickling and in the soap and allied syndet industries. Their non-flammable properties make them of particular utility in such uses wherein rather high temperatures are encountered, e. g., in hydraulically operated billet pushers, and also in systems where safety precautions demand non-flammable characteristics in such systems to guard against potential explosions resulting from trace vapor leaks, e. g., in hydrulically operated aircraft catapults.

The higher molecular weight normally solid polyfluoroethyl and substituted ethyl oxime ethers of this invention likewise are generically non-corrosive, thermally stable, non-flammable, and have little if any swelling action on rubber and synthetic rubber products. Accordingly, these materials find use as lubricants, particularly extreme pressure lubricants, for instance, in high temperature, high pressure turbines. The higher molecular weight products for the same reasons find use as heat transfer agents, particularly in high temperature closed systems.

As many apparently widely different embodiments of this invention may be made without departing from the spirit and scope thereof, it is to be understood that we do not limit ourselves to the specific embodiments thereof except as defined by the appended claims.

The embodiments of the invention in which an exclusive property or privilege is claimed are defined as follows:

1. A process for the manufacture of polyfluoroethers of oximes which comprises reacting a polyhalogenomonoolefin, having the ethylenic linkage a terminal one and having at least three halogens on doubly bonded carbon, at least one of said halogens being fluorine and having any singly bonded carbon externally joined only to fluorine, with the alkali metal salt of the oxime of a monooxohydrocarbon of from 2 to 18 carbon atoms which is free from non-aromatic unsaturation, hydrolyzing the resulting compound and extracting the oxime ether.

2. The process of claim 1 wherein the reaction is carried out under pressure in an inert organic solvent and at a temperature within the range of from room temperature to 150° C.

3. A process for the preparation of a tetrafluoroethyl oxime ether which comprises reacting tetrafluoroethylene with the alkali metal salt of a monooxohydrocarbon of from 2 to 18 carbon atoms and free from non-aromatic carbon-carbon unsaturation, under pressure at a temperature within the range of from room temperature to 150° C., and then hydrolyzing the resultant reaction mixture.

4. A process for the preparation of a chlorotrifluoroethyl oxime ether which comprises reacting chlorotrifluoroethylene with the alkali metal salt of a monoketohydrocarbon of from 2 to 18 carbon atoms and free from non-aromatic carbon-carbon unsaturation, under pressure at a temperature within the range of from room temperature to 150° C., and then hydrolyzing the resultant reaction mixture.

5. A process for the preparation of the O-(1,1,2,2-tetrafluoroethyl) ether of cyclohexanone oxime which comprises reacting tetrafluoroethylene with an alkali-metal salt of cyclohexanone oxime under pressure at a temperature within the range of from room temperature to 150° C., and then hydrolyzing the resultant reaction mixture.

6. The O-polyhalogenoalkyl ether of the oxime of a monooxohydrocarbon of from 2 to 18 carbon atoms and free from non-aromatic unsaturation, the polyhalogenoalkyl radical containing one hydrogen on the $\beta$ carbon atom, at least one fluorine on the $\beta$ carbon atom, only fluorine on any further carbons and with any remaining valence of the $\alpha$ carbon atom bonded to halogens of atomic number up to 17 and of the $\beta$ carbon atom to fluorine.

7. The O-tetrafluoroethyl ether of the oxime of a monooxohydrocarbon of from 2 to 18 carbon atoms and free from non-aromatic unsaturation.

8. The O-tetrafluoroethyl ether of the oxime of a monoketohydrocarbon of from 2 to 18 carbon atoms and free from non-aromatic unsaturation.

9. The O-polyfluoroethyl ether of the oxime of a monooxohydrocarbon of from 2 to 18 carbon atoms and free from non-aromatic unsaturation, the polyfluoroethyl group containing at least three fluorines, one of which is on the $\alpha$-ethyl carbon, only one hydrogen and this on the $\beta$-ethyl carbon with any remaining valence of ethyl carbon atoms satisfied by halogen of atomic number up to 17.

10. The O-(1,1,2,2-tetrafluoroethyl) ether of cyclohexanone oxime.

11. The chlorotrifluoroethyl ether of cyclohexanone oxime.

12. The process of claim 1 wherein two of the holgens on doubly bonded carbon of the polyhalogenomonoolefin are chlorine.

13. The process of claim 1 wherein three of the halogens on doubly bonded carbon of the polyhalogenomonoolefin are fluorine.

14. An oxime ether according to claim 6 wherein the polyhalogenoalkyl radical has two fluorines on the $\alpha$-carbon atom.

15. An oxime ether according to claim 6 wherein the polyhalogenoalkyl radical has two fluorines on the $\alpha$-carbon atom.

References Cited in the file of this patent
UNITED STATES PATENTS 2,409,315   Rigby et al. _____ Oct. 15, 1946